Feb. 12, 1963  M. E. HAMILTON  3,077,231
AGRICULTURAL IMPLEMENT
Filed Aug. 31, 1960  2 Sheets-Sheet 1

INVENTOR.
MATTHEW E. HAMILTON
BY
Emerson B Donnell
ATTORNEY

Feb. 12, 1963
M. E. HAMILTON
3,077,231
AGRICULTURAL IMPLEMENT
Filed Aug. 31, 1960
2 Sheets-Sheet 2
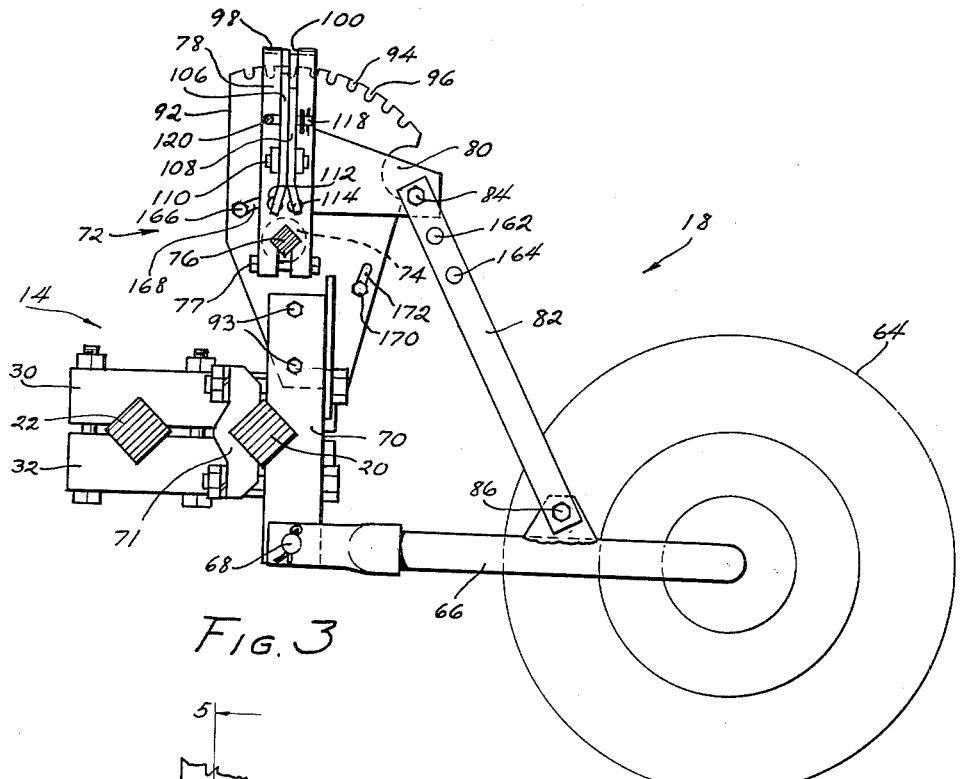
FIG. 3
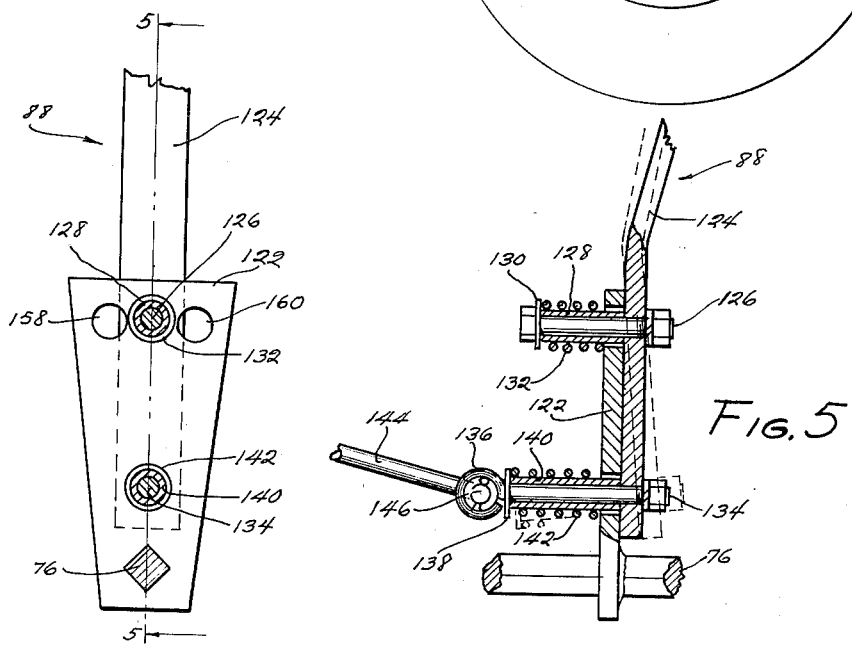
FIG. 4
FIG. 5
INVENTOR.
MATTHEW E. HAMILTON
BY
Emerson B Donnell
ATTORNEY United States Patent Office 3,077,231
Patented Feb. 12, 1963

3,077,231
AGRICULTURAL IMPLEMENT
Matthew E. Hamilton, Stockton, Calif., assignor to J. I. Case Company, Racine, Wis., a corporation of Wisconsin
Filed Aug. 31, 1960, Ser. No. 53,233
11 Claims. (Cl. 172—421)

The present invention relates to agricultural implements, and an object thereof is to generally improve the construction and operation of devices of this class.

More particularly, the invention relates to gage wheels for supporting relatively heavy implements distributed along a structure extending transversely of a tractor or otherwise. In such implements, an extensive transverse structure or tool bar is supported on and projects a considerable distance at either side of the tractor or other support and is equipped with gage wheels at its outer ends. It is desirable for the wheels to be adjustable for height—or more properly for the structure to be adjustable up and down in relation to the wheels—from a point removed a considerable distance from the wheels themselves, commonly from the position of the tractor operator, or from the inner ends of the outwardly extending portions of the tool bar. With controls adjacent the operator, relatively long connections are necessary to the gage wheel adjusting mechanisms, and the results of attempted adjustment tend to be erratic. Furthermore, if the gage wheels are secured in adjustment by detent or latching means at the controls, the flexibility of the long connections is likely to permit serious errors in adjustment as well as substantial deviation from the chosen adjustment under varying conditions, even if the adjustment was correct in the first instance, and a further object of the invention is to avoid erratic adjustment of such gage wheels, and to maintain, in a dependable manner, whatever adjustment is selected.

A further object is to provide for locking the gage wheels in regions close to the wheels so that the actuating connections are relieved of any substantial stress or load when the implement is in use.

A further object is to provide means for actuating the locking device of a gage wheel which locking device is located in the region of the gage wheel, from a point remote therefrom, in the illustrated instance at the midportion of the tool bar adjacent the tractor operator.

A further object is to provide an improved detent or latch construction which gives relatively fine adjustment, while at the same time having ample strength to withstand the very considerable stresses resulting from the action of the gage wheel in supporting the relatively heavy implements and controlling their depth of operation.

A further object is to provide, in a structure having the above advantages, for ready adjustment or relocating of the parts along the structure to suit various widths or spacing of plant rows on which the device is adapted to work.

Further objects and advantages will become apparent from the following specification and accompanying drawings in which:

FIG. 3 is a vertical sectional view taken substantially on the line 3—3 of FIG. 2.

FIG. 4 is an enlarged vertical sectional view on the line 4—4 of FIG. 2.

FIG. 5, is a vertical sectional view substantially on the line 5—5 of FIG. 4.

Figure 1:
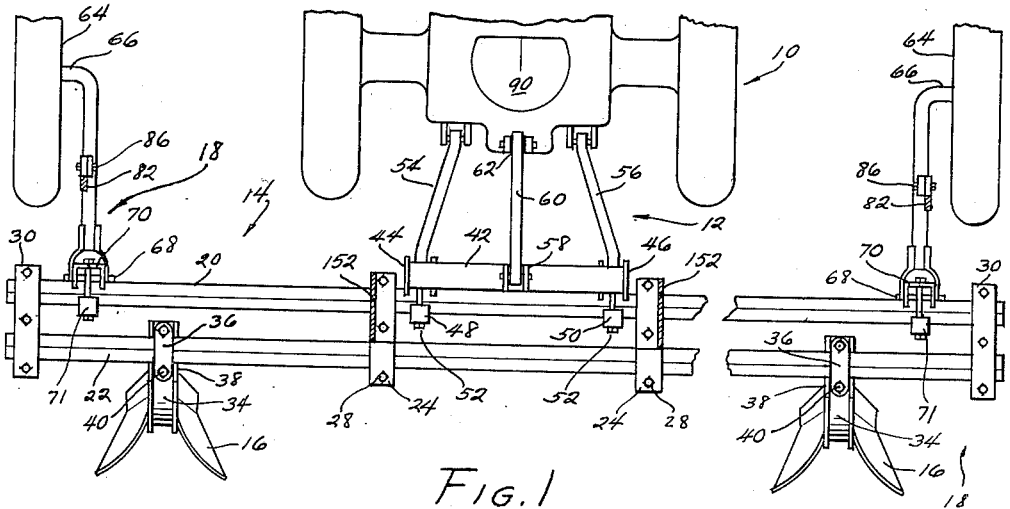
FIG. 1 is a plan view of a portion of a tractor implement assembly embodying the invention with some parts removed.

Similar reference characters have been applied to the same parts wherever they appear throughout this specification and the drawings, in which an illustrative embodiment is shown, but it is to be understood that the invention is not to be taken as limited to the construction illustrated and described, or in fact, in any manner except as defined in the claims. Referring to FIG. 1, the assemblage includes a tractor 10 having a hitch or support arrangement generally designated as 12, connected to a laterally disposed structure generally designated as 14, carrying a plurality of implements 16 which may be of any suitable type, for example, lister bottoms which, as is well known are relatively heavy and which have a definite "suck" or tendency to run deeper in the ground than desired. Structure 14, in the present instance, has at each end, a gage wheel assembly generally designated as 18, which assemblies are preferably identical with the exception that one is adapted for location at the right hand end of structure 14 while the other is adapted for location at the left hand end of structure 14. For this reason, only the assembly at the left end of structure 14 will be described in detail.

Figure 2:
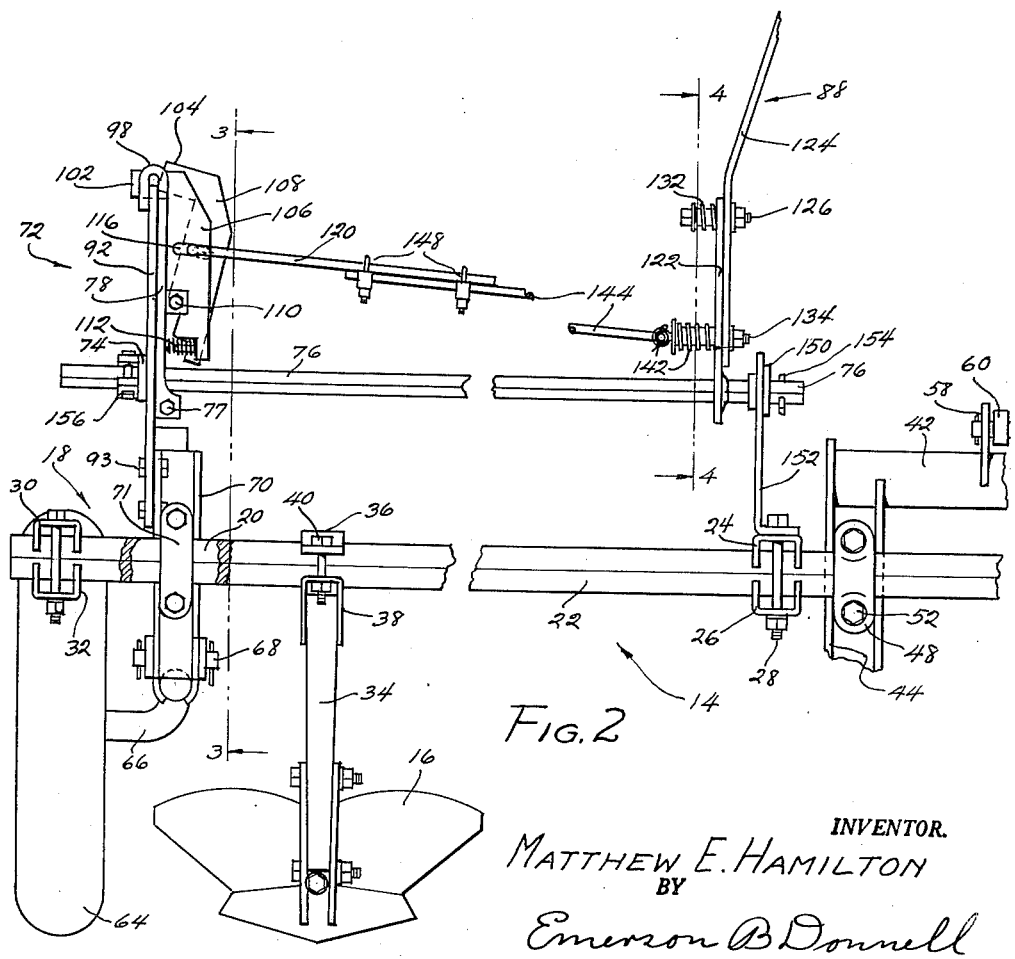
FIG. 2 is an enlarged fragmentary rear elevation of a portion of a device embodying the invention.

Turning also to FIG. 2, the device is shown in connection with what is known in the trade as a tool bar lister of the type adapted to be mounted on a tractor to project therefrom a substantial distance at either side, FIG. 2 showing only the left side as the other would be identical except for the reversal of certain parts.

Structure 14 comprises, in the present instance, a pair of spaced apart square bars 20 and 22, connected with each other adjacent hitch 12 by longitudinally disposed clamps 24, 26 united by clamping bolts as 28, clamps 24, 26 serving to space bars 20 and 22 in a fore-and-aft direction. Similarly, clamps 30, 32 connect bars 20 and 22 remote from hitch 12, the whole constituting a very strong rigid frame extending outwardly or to the left from hitch 12. Lister bottoms 16 have beams 34 of suitable or well-known type fixed in conventional manner thereto and extending upwardly and clamped in a suitable or conventional manner, in the present instance, to bar 22, clamps 36 and 38 being united by bolts as 40 in the illustrative embodiment. It is to be understood that lister 16 is typical of a variety of implements which can be carried on structure 14 within the contemplation of the invention.

Hitch 12 comprises a transversely arranged member or pipe 42 having at its ends, downwardly extending legs 44 and 46 which are rigidly clamped to bar 20 by clamps 48 and 50 secured by bolts as 52. Legs 44 and 46 are pivotally connected in any suitable manner to drawbar or link members 54 and 56 pivoted to the tractor for up-and-down swinging movement, and a mast or connection 58 extends upwardly from member 42 and is pivotally connected with an upper or thrust link 60 pivotally connected to the tractor at 62. As will be apparent, hitch assembly 12, as so far described, will be capable of up-and-down movement about the pivotal connections with tractor 10 while being maintained in a position generally parallel to its original position. Thus, hitch 12 serves as a floating connection to the tractor for structure 14.

Mechanism of well-known type, not shown, is arranged to shift hitch 12 in the direction described so as to raise structure 14 so that lister bottoms 16 will clear the ground when desired.

While structure 14 is very strong, in view of the weight and downward tendency of bottoms 16, it would not be practical to support them solely from hitch 12, and for this reason, above-mentioned gage wheel assemblies 18 are provided. Each assembly comprises a wheel 64 journaled on a suitable axle 66, pivoted at 68, FIG. 3, to a clamping portion 70 having a cap portion 71 and constituting part of a quadrant assembly generally designated as 72. Quadrant assembly 72 has journaled thereon, in a flanged bushing 74 of well-known type, a rockshaft 76 above and extending in a direction generally parallel to bars 20 and 22 and to which is clamped by means of a bolt 77, a latch support 78 having fixed on, or otherwise united therewith, an arm 80. Latch support 78 is mounted in face to face relation to quadrant structure 72, except as hereinafter explained, and is connected to axle 66 through a link 82, pivoted on a pivot 84 to arm 80, and on a pivot 86 to axle 66. Latch support 78 is normally maintained in fixed relation to above-mentioned clamping portion 70 and quadrant structure 72, but may be released as will appear. Swinging of arm 80 by rockshaft 76 will swing axle 66 about pivot 68 and raise or lower structure 14 in relation to the ground. As will now be apparent, structure 14 may roll behind tractor 10 resting on gage wheels 64 while hitch 12 may swing up-and-down to accommodate irregularities in the ground.

Adjustment of gage wheels 64, as described, will therefore alter the height of structure 14, and accordingly, the depth of operation of lister bottoms 16.

Rocking of rockshaft 76 is accomplished through a lever 88, FIG. 2, welded or otherwise fixed with rockshaft 76 and which extends within reach of an operator on seat 90 of tractor 10. However, it will be apparent, that latch support 78, in order for the wheel 64 to support structure 14, must be held immovable in relation to quadrant structure 72. Since the forces involved are quite substantial, it would be preferable to avoid transmitting them continuously through the rather long rockshaft 76 to lever 88, and for this reason, these stresses are intentionally localized in quadrant structure 72. A plate 92, fixedly secured to clamping portion 70, as by bolts 93, has an arcuate upper margin and provides a plurality of notches, as 94 and 96. Above-mentioned latch support 78 comprises a plate swingable adjacent above-mentioned plate 92, and which is bent at 98 so as to enclose or embrace the notched portion of plate 92, see also FIG. 3. Bent portion 98 also provides a slot 100, in which are reciprocable, the engaging portions 102 and 104 of rockable latch members 106 and 108, respectively. Latch members 106 and 108 are pivoted on a fulcrum 110 mounted on latch support 78 between bent portion 98 and rockshaft 76, and each has a spring, 112 and 114 respectively, pressing outwardly from plate 78 so as to urge portions 102 and 104 toward engagement with notches 94 and 96. As will be apparent, with either of latch portions 102 and 104 in engagement with any of the notches 94 and 96, latch support 78 will be immovably secured in relation to quadrant plate 92. When it is desired to adjust gage wheel 64 by rocking rockshaft 76, it is therefore necessary to withdraw latches 106 and 108 from notches 94 and 96 and this is accomplished as follows:

Each of latches 106 and 108 has a slot as 116 in which is engaged, in the present instance, the bent end 118 of a latch control rod or extension means 120.

As seen in FIG. 3, latches 106 and 108 are immediately juxtaposed, or in face to face contact with each other and confined by above-mentioned slot 100 in latch support 78. In the present instance, notches 94 and 96 are dimensioned to admit only one engaging portion 102 and 104 at a time. Furthermore, the portions between notches 94 and 96 are preferably of approximately the same thickness as latches 106 and 108. Therefore, only one of engaging portions 102 and 104 may be accommodated in one or another of notches 94 and 96 at one time. In FIG. 2, portion 102 is in engagement with one of the notches while portion 104 is resting against plate 92 between adjacent notches. A pull on rod 120 to the right, as seen in FIG. 2, will engage bent portion 118 with the end of slot 116, in whichever latch member 108 or 106 is engaged with plate 92, and will rock the latch so as to withdraw portion 102 or 104 from plate 92 so that rockshaft 76 and latch support 78 may be rocked in the desired direction. Release of rod 120 will allow whichever latch portion 102 and 104 is in alignment with one of notches 94 and 96, to drop into engagement with said notch and lock the parts in the position attained. In this way, latch holder 78 may be locked in engagement in very small increments of movement along quadrant 92, while at the same time, notches 94 and latches 106 and 108 may be of substantial width and of ample strength to withstand the stresses involved.

Lever 88, as best seen in FIGS. 2 and 5, comprises two parts, a base 122 welded as aforesaid to rockshaft 76 to which base is connected an elongated handle portion 124. Handle portion 124 is connected to base portion 122 by means of a bolt 126 extended through portions 124 and 122, a spacer 128 being clamped securely against portion 124 by above-mentioned bolt 126, a washer 130 being interposed and engaging a spring 132. Spacer 128 is loosely fitted in an opening in base 122 so as to permit limited rocking movement of handle portion 124 generally in the direction of rockshaft 76, spring 132, however, being strong enough to maintain base portion 122 and handle portion 124 in forcible but yielding contact with each other. Another bolt 134 spaced toward rockshaft 76 from bolt 126 is preferably longer than bolt 126 and terminates outwardly of base 122 in an eye 136. A washer 138 engaged with eye 136 clamps a spacer 140 between itself and handle portion 124 and is loosely engaged in an opening in base portion 122. Spacer 140 is surrounded by a light spring portion 142, springs 132 and 142 tending to maintain portion 124 in face to face contact with base portion 122. A pull rod 144 has a bent portion 146 engaged in eye 136 and is fixed by clamps 148, FIG. 2, in relation to above-mentioned latch control rod 120. As will be apparent, rocking handle portion 124 to the left, as seen in FIGS. 5 and 2, will compress spring 142 and shift rods 144 and 120 to the right, releasing latches 106 and 108, as hereinbefore described. Bolt 134 therefore becomes an actuating means for rods 144 and 120. Lever 88 or handle portion 124 may then be forced forwardly or in a direction normal to rockshaft 76, thereby rocking the latter and effecting adjustment of latch support 78, arm 80 and, through link 82, gage wheel 64. Since spring 132 is relatively strong, while it will not interfere appreciably with the first movement of handle portion 124, it will prevent any unwanted rocking movement between handle portion 124 and base portion 122 so that the lever will be stable for exerting the necessary pressure to accomplish the adjustment.

Rockshaft 76, as best shown in FIG. 2, is supported at its inner end in a flanged bushing 150 rotatable in a bracket 152, preferably secured to above-mentioned clamp 24 by means of hereinbefore-mentioned bolts 28. Rockshaft 76 is preferably, although not necessarily, of square or angular cross-section, whereas bushings 150 and 74 have openings suitably shaped to receive rockshaft 76. The bushings, however, are round or cylindrical on their outer surfaces and received in complementary openings in bracket 152 and plate 92, and thus provide for rocking of the angular shaft 76 in its supports.

A cotter 154 prevents inward displacement of bushing 150, while a clamping collar 156 clamped on shaft 76 beyond bushing 74 prevents outward displacement thereof and inward displacement of rockshaft 76. Outward displacement of rockshaft 76 is prevented by the face to face contact of plate 78 with quadrant portion 92.

With the mechanism so far described, it will be apparent that outward movement of handle portion 124 will release latches 106 and 108 and allow forward or backward movement of handle portion 124, rocking rockshaft 76 and adjusting wheel 64 up or down as desired, releasing of handle portion 124, allowing one or the other of latches 106 and 108 to engage with the nearest notch 94 or 96 to lock the parts in the desired position. This operation may be facilitated by utilizing the usual power lifting mechanism, not shown, through hitch 12 to take the weight off of wheels 64.

Different implements may require different relations bewteen gage wheels 64 and structure 14. In other words, wheel 64 might be used for long periods with a relation to structure 14 which would bring handle portion 124 into an awkward position, as related to seat 90. If this is the case, handle portion 124 may be arranged with bolt 126 in one or the other of openings 158 and 160, FIG. 4, which will locate the lever in a different range of movement from that shown. If this adjustment is insufficient, the link 82 associated with axle 66 may be pivoted on pivot 84 through other openings 162 and 164 which will bring axle 66 into a different angular relation with arm 80 and change the range of adjustment of wheel 64. By virtue of these two adjustments, virtually any kind of implement may be accommodated on structure 14, regardless of the amount of clearance required therebeneath, while lever 88 is arranged generally within easy reach of the tractor operator.

The spacing of implements 16 may be changed by loosening bolts 40, FIG. 2, and sliding clamps 36 and 38 to any required position, and similar adjustments are possible for other implements which may be mounted on structure 14, these changes requiring adjustments in the spacing between the tractor or hitch 12 and gage wheel assembly 18. Such adustments are accomplished by loosening clamp 70—71, bolt 77 and the collar 156. Clamps 148 on pullrod 144 are also loosened after which the entire assembly 18 may be shifted along bars 20 and 22 to whatever extent is necessary. Bushing 74 will slide along rockshaft 76 and latch control rod 120 will slide in clamps 148 relatively to pullrod 144. When the new adjustment has been achieved, tightening of the several clamps will maintain the parts in their new positions.

As seen in FIG. 3, a bolt 166 is clamped in a slot 168 in plate 92, in position to be contacted by latch support 78 to limit swinging thereof in a rearward direction and thus determine a maximum amount of rise for wheel 64, or more properly, a maximum depth of penetration of any implements on structure 14. By adjusting bolt 166 in slot 168, any desired depth may be defined and which may be set repeatedly without special attention on the part of the operator by merely rocking lever 88 as far to the rear as it will go, which rocks latch support 78 against bolt 166. In similar manner a bolt 170 is clamped in a slot 172, also in plate 92, and in position to be contacted by arm 80 to limit downward swinging thereof and thus define a maximum upper position for structure 14. Such position may be accomplished repeatedly and without special attention by merely rocking lever 88 forward as far as it will go, which will rock arm 80 into contact with bolt 170.

The operation of the arrangement is thought to be clear from the foregoing, it being apparent that an outward thrust on lever 88 will release latches 106 and 108 whereupon a fore-and-aft movement of the lever will adjust gage wheel 64 up or down as desired. Releasing of lever 88 will cause one or the other of latches 106 and 108 to engage the nearest notch in quadrant 92 and lock the parts in the new adjustment. The arrangement is easily adjusted for width of rows and for the required clearance beneath the tool bars by re-arranging handle portion 124 in relation to base portion 122 and by re-arranging link 82 in relation to arm 80.

The above being a complete description of an illustrative embodiment of the invention, what is claimed as new and desired to be secured by Letters Patent of the United States is:

1. In a machine of the type adapted to carry and propel a plurality of ground working tools at selected spacing from each other, the combination of an elongated transversely disposed structural element floatingly supported adjacent its mid-portion and propelled over the ground, a plurality of ground working implements supported on said structure, a gage wheel adjacent and in supporting relation to each end of said structure arranged for up-and-down movement relatively to said structure and engaged with the ground for supporting said structure and for adjusting the working depth of said implements, mechanism for effecting such up-and-down movement including a swingable arm journaled on said structure and connected with said gage wheel for raising and lowering the same, a manually operable member adjacent said mid-portion and connected to said arm for rocking movement therewith, quadrant and latch means adjacent said arm, including latch means engaged with said quadrant and with said arm in a predetermined location and engageable with said quadrant in a plurality of other locations to lock said arm and said gage wheel in a selected position against movement, and a connection from said manually operable member to said latch and operable for releasing said latch and said arm so that the position of said arm and consequently said gage wheel may be changed by movement of said operable member.

2. In a machine of the type adapted to carry and propel a plurality of ground working tools at selected spacing from each other, the combination of an elongated transversely disposed structural element floatingly supported adjacent its mid-portion and propelled over the ground, a plurality of ground working implements supported on said structure, a gage wheel adjacent to and in supporting relation with each end of said structure, means connecting said gage wheels to said structure adapted to provide for up-and-down movement of said gage wheels relatively to said structure, said gage wheels being engaged with the ground for supporting said structure and for adjusting the working depth of said implements, mechanism adjacent each gage wheel for effecting such up-and-down movement and connected with said gage wheel for raising and lowering the same, a manually operable member adjacent said mid-portion and connected to said mechanism, quadrant and latch means adjacent said mechanism including latch means engaged with said quadrant in a predetermined location and engageable therewith in a plurality of other locations to lock said mechanism and said gage wheel in a selected position against movement, means connected with said latch means and extended to said mid-portion, and means adjacent said mid-portion connected to the latter means and operable for releasing said latch means so that the position of said gage wheel may be changed by movement of said manually operable member.

3. In a machine of the type adapted to carry and propel a plurality of ground working tools at selected spacing from each other, the combination of an elongated transversely disposed structural element floatingly supported adjacent its mid-portion and propelled over the ground, a plurality of ground working implements supported on said structure, a gage wheel adjacent each end of said structure, means connecting said gage wheels to said structure adapted to provide for up-and-down movement of said gage wheels relatively to said structure, said gage wheels being engaged with the ground for supporting said structure and for adjusting the working depth of said implements, mechanism for effecting such up-and-down movement including a swingable arm adjacent each gage wheel journaled on said structure and connected with said gage wheel for raising and lowering the same by reason of swinging of said arm, a rockshaft fixed in relation to said arm, journaled on and extending along said structural element to said mid-portion, a hand lever adjacent to said mid-portion connected to said rockshaft for rocking movement therewith in a plane transverse to said rockshaft and pivoted for rocking movement independently thereof substantially in the plane of said rockshaft, a quadrant adjacent said arm, a latch support secured in fixed relation to said arm, a latch on the latch support engaged with said latch support and with said quadrant in a predetermined location and engageable therewith in a plurality of other locations to lock said latch support and said arm and said gage wheel in a selected position against movement, and means connected with and extending between said hand lever and said latch and operable by reason of movement of said hand lever in the last-mentioned direction for releasing said latch from said quadrant so that the position of said arm and consequently of said gage wheel may be changed by movement of said hand lever in the direction to rock said rockshaft.

4. In a machine of the type adapted to carry and propel a plurality of ground working tools at selected spacing from each other, the combination of an elongated transversely disposed structural element floatingly supported adjacent its mid-portion and propelled over the ground, a plurality of ground working implements supported on said structure, a gage wheel adjacent one end of said structure, means connecting said gage wheel to said structure adapted to provide for up-and-down movement of said gage wheel relatively to said structure, said gage wheel being engaged with the ground for supporting said structure and for adjusting the working depth of said implements, mechanism for effecting such up-and-down movement including a swingable arm adjacent said gage wheel journaled on said structure and connected with said gage wheel for raising and lowering the same by reason of swinging of said arm, a rockshaft fixed in relation to said arm, journaled on and extending along said structural element to said mid-portion, a hand lever adjacent said mid-portion connected to said rockshaft for rocking movement therewith in a plane transverse to said rockshaft and pivoted for rocking movement independently thereof substantially in a plane of said rockshaft, a quadrant adjacent said arm, a latch support secured in fixed relation to said arm, latch means on the latch support engaged with said latch support and with said quadrant in a predetermined location and engageable therewith in a plurality of other locations to lock said latch support and said arm and said gage wheel in a selected position against movement, and means connected with and extending between said hand lever and said latch means and operable by reason of movement of said latch lever in the last-mentioned direction for releasing said latch means from said quadrant so that the position of said arm and consequently of said gage wheel may be changed by movement of said hand lever in the direction to rock said rockshaft.

5. In a machine of the type adapted to carry and propel a plurality of ground working tools at selected spacing from each other, the combination of an elongated transversely disposed structural element floatingly supported adjacent its mid-portion and propelled over the ground, a plurality of ground working implements supported on said structure, a gage wheel adjacent each end of said structure arranged for up-and-down movement relatively to said structure and engaged with the ground for supporting said structure and for adjusting the working depth of said implements, mechanism for effecting such up-and-down movement including a swingable arm journaled on said structure and connected with said gage wheel for raising and lowering the same, a manually operable member adjacent said mid-portion connected to said arm for rocking movement therewith, a quadrant adjacent said arm, latch means engaged with said quadrant and with said arm in a predetermined location and engageable with said quadrant in a plurality of other locations to lock said arm and said gage wheel in a selected position against movement, and a connection from said manually operable member to said latch and operable for releasing said latch and said arm so that the position of said arm and consequently of said gage wheel may be changed by movement of said manually operable member.

6. In a machine of the type adapted to carry and propel a ground working tool the combination of a support, an elongated structural element extending from said support transversely to the direction of travel, a ground working tool supported on said structure, a gage wheel adjacent the end of said structure remote from said support, means connecting said gage wheel to said structure adapted to provide for up-and-down movement of said gage wheel relatively to said structure, said gage wheel being engaged with the ground for supporting said structure and for adjusting the working depth of said implement, mechanism for effecting such up-and-down movement including a quadrant connected to said structure adjacent said one end thereof, a latch, support means connected with said latch and with said gage wheel to compel movement of said latch by reason of up-and-down movement of said gage wheel, said latch being engaged with said quadrant in a predetermined loctaion whereby to secure said gage wheel against said up-and-down movement, said latch being engageable with said quadrant in another location to lock said gage wheel in a selected position against movement, a manually operable member adjacent said support, extension means connected with said latch extending to a point adjacent to said support remote from said latch, actuating means at said support engaged with said extension means for releasing said latch from said quadrant, and means extended from said mechanism along said structure to said manually operable member and connected therewith for actuating said mechanism for raising and lowering said gage wheel by reason of operation of said manually operable member when said latch is disengaged from said quadrant.

7. In a machine of the type adapted to carry and propel a ground working tool the combination of a support, an elongated structural element extending from said support transversely to the direction of travel, a ground working tool supported on said structure, a gage wheel adjacent the end of said structure remote from said support, means connecting said gage wheel to said structure adapted to provide for up-and-down movement of said gage wheel relatively to said structure, said gage wheel being engaged with the ground for supporting said structure and for adjusting the working depth of said implement, mechanism for effecting such up-and-down movement including a quadrant connected to said structure adjacent said one end thereof, a latch, support means connected with said latch and with said gage wheel to compel movement of said latch by reason of up-and-down movement of said gage wheel, said latch being engaged with said quadrant in a predetermined location whereby to secure said gage wheel against said up-and-down movement, said latch being engageable with said quadrant in another location to lock said gage wheel in a selected position against movement, a manually operable member adjacent said support, means connected with said latch extending to and connected with said manually operable member for releasing said latch from said quadrant by reason of operation of said manually operable member, means connected with and extended from said mechanism along said structure to a point adjacent to said support and adapted upon actuation to cause said mechanism to raise and lower said gage wheel, and means at said support connected with said means extending from said mechanism, for actuating said mechanism for raising and lowering said gage wheel when said latch is disengaged from said quadrant.

8. In a machine of the type adapted to carry and propel a ground working tool the combination of a support, an elongated structural element extending from said support transversely to the direction of travel, a ground working tool supported on said structure, a gage wheel adjacent the end of said structure remote from said support, means connecting said gage wheel to said structure adapted to provide for up-and-down movement of said gage wheel relatively to said structure, said gage wheel being engaged with the ground for supporting said structure and for adjusting the working depth of said implement, mechanism for effecting such up-and-down movement including a quadrant connected to said structure adjacent said one end thereof, a latch, support means connected with said latch and with said gage wheel to compel movement of said latch by reason of up-and-down movement of said gage wheel, said latch being engaged with said quadrant in a predetermined location whereby to secure said gage wheel against said up-and-down movement, a manually operable member adjacent said support, said latch being engageable with said quadrant in another location to lock said gage wheel in a selected position against movement, means extended from said mechanism along said structure and connected to said manually operable member for actuating said mechanism for raising and lowering said gage wheel by reason of operation of said manually operable member when said latch is disengaged from said quadrant, and means on said manually operable member extended along said structural element and connected with said latch for releasing said latch from said quadrant to free said gage wheel for up-and-down movement by reason of actuation of said manually operable member.

9. In a machine of the type adapted to carry and propel a plurality of ground working tools and including an elongated transversely disposed structural element floatingly supported adjacent its mid-portion and propelled over the ground, a gage wheel adjacent one end of said structure arranged for up-and-down movement relatively to said structure and engaged with the ground for supporting said structure and for adjusting the working depth of said implements, mechanism on said structural element for effecting such up-and-down movement and retaining said wheel in adjusted position including a fixed quadrant providing a plurality of peripheral notches of predetermined width, spaced from each other by portions of a width substantially equal to the width of said notches, a latch support connected with said gage wheel and providing an opening of a width substantially equal to one of said peripheral notches plus one of the spacing portions between said notches, said latch support being swingable in juxtaposition to said quadrant, and a pair of latches of a thickness substantially equal to the width of said notches disposed in face-to-face relation in said opening in said latch support and resiliently urged in the direction of said notches, means for withdrawing said latches from said notches, and means for swinging said latch support when said latches are withdrawn, whereby one only of said latches may enter one of said notches while both latches fill the space within said opening in said latch support, and whereby said latches may successively occupy the same notch to give small increments of adjustment with latches of substantial thickness.

10. In a machine of the type adapted to carry and propel a plurality of ground working tools and including an elongated transversely disposed structural element floatingly supported adjacent its mid-portion and propelled over the ground, a gage wheel adjacent one end of said structural element arranged for up-and-down movement relatively to said structural element and engaged with the ground for supporting said structural element and for adjusting the working depth of said implements, mechanism on said structural element for effecting such up-and-down movement and retaining said wheel in adjusted position including a fixed quadrant providing a plurality of peripheral notches spaced from each other, a latch support connected with said gage wheel providing an opening and being swingable in juxtaposition to said quadrant by reason of up-and-down movement of said gage wheel, a latch shiftably mounted in said opening in said latch support and engaged with one of said notches, a hand lever adjacent said mid-portion, a rockshaft fixed in relation to said latch support extending along said structure and connected to said hand lever to be rocked by movement of said lever in one direction, and a rod connected to said latch extending along said structure and connected to said lever in a position to be actuated by movement of said lever in another direction to shift said latch out of engagement with said notch so that moving of said lever in the first-mentioned direction will adjust the height of said gage wheel through rocking of said rockshaft and swinging of said latch support.

11. In a machine of the type adapted to carry and propel a plurality of ground working tools and including an elongated transversely disposed structural element floatingly supported adjacent its mid-portion and propelled over the ground, a gage wheel adjacent one end of said structural element arranged for up-and-down movement relatively to said structural element and engaged with the ground for supporting said structural element and for adjusting the working depth of said implements, mechanism on said structural element for effecting such up-and-down movement and retaining said wheel in adjusted position including a fixed quadrant providing a plurality of peripheral notches spaced from each other, a latch support connected with said gage wheel and swingable in juxtaposition to said quadrant by reason of up-and-down movement of said gage wheel, a latch shiftably mounted on said latch support and engaged with one of said notches, a hand lever adjacent said mid-portion, a rockshaft fixed in relation to said latch support extending along said structure and connected to said hand lever to be rocked by movement of said lever in one direction, and a rod connected to said latch extending along said structure and connected to said lever in a position to be actuated by movement of said lever in another direction to shift said latch out of engagement with said notch so that moving of said lever in the first-mentioned direction will adjust the height of said gage wheel through rocking of said rockshaft and swinging of said latch support.

References Cited in the file of this patent

UNITED STATES PATENTS 636,753    Burkhart  --------------- Nov. 14, 1899